United States Patent [19]

Rawald

[11] Patent Number: 4,998,701
[45] Date of Patent: Mar. 12, 1991

[54] DECORATIVE HARDWARE MOUNTING SYSTEM

[75] Inventor: Kenneth E. Rawald, Huntington Beach, Calif.

[73] Assignee: Masco Building Products Corp., Taylor, Mich.

[21] Appl. No.: 454,212

[22] Filed: Dec. 21, 1989

[51] Int. Cl.$^5$ .............................................. A47B 96/00
[52] U.S. Cl. .............................. 248/224.3; 248/205.1; 248/686; 403/361; 403/362; 411/104
[58] Field of Search ...................... 248/224.3, 345, 200, 248/205.1, 220.2, 225.1, 309.2, 686; 403/361, 362; 411/104

[56] References Cited

U.S. PATENT DOCUMENTS

| | | | |
|---|---|---|---|
| 2,940,711 | 6/1960 | Peters | 248/205.1 |
| 3,305,200 | 2/1967 | Avery | 248/224.3 X |
| 4,361,930 | 12/1982 | Seesengood | 403/361 X |
| 4,861,182 | 8/1989 | Gillet | 411/104 X |

Primary Examiner—Ramon O. Ramirez
Attorney, Agent, or Firm—Myron B. Kapustij; Edgar A. Zarins

[57] ABSTRACT

A concealed mounting assembly includes an outer post member and a decorative rose plate mounted on a concealed bracket which has a post section and mounting plate section. The post has an axially extending bore which receives the post section of the concealed bracket. A securement nut is placed within an axially extending recess in the post section. The post section also has an elongated aperture extending from the recess. The post and securement nut have alignable apertures therethrough a allow a threaded fastener to extend through the lateral aperture, elongated slot in the post section and the threaded aperture in the securement nut. The fastener, when tightened, secures the post and rose plate onto the concealed bracket and allows axial adjustment for manufacturing tolerances and secures the mountable post against torque forces.

8 Claims, 1 Drawing Sheet

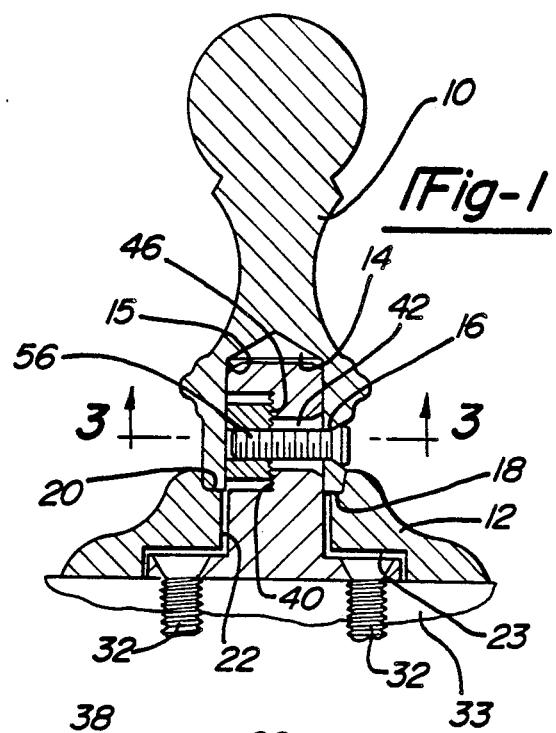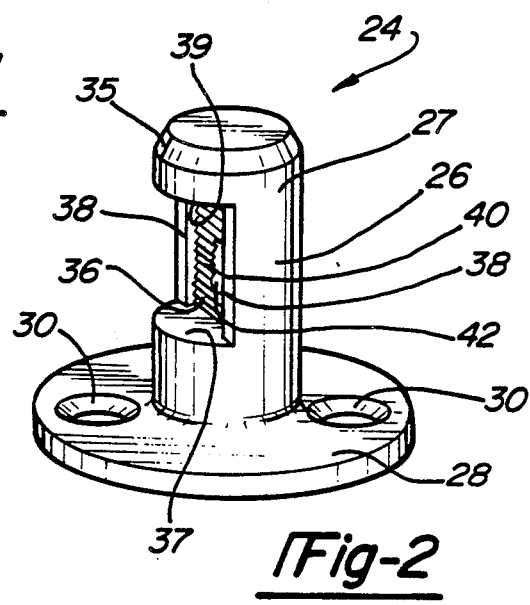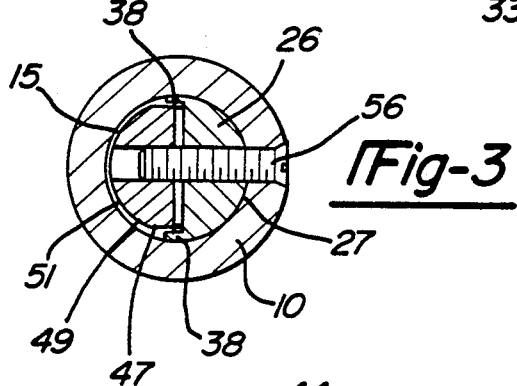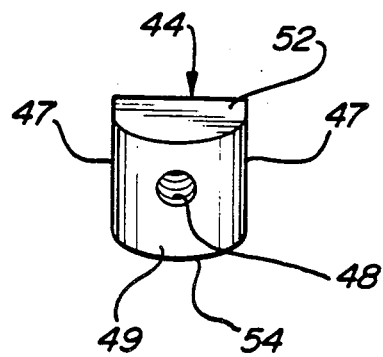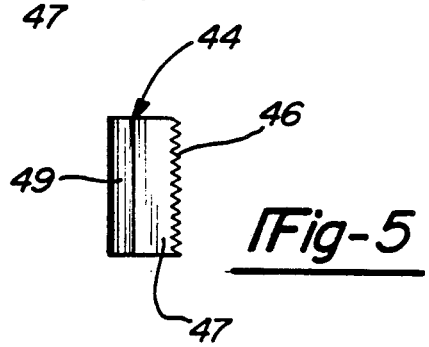

DECORATIVE HARDWARE MOUNTING SYSTEM

TECHNICAL FIELD

This invention relates to a concealed mounting system for decorative hardware particularly adaptable for soap dishes, toothbrush and cup holders and the like.

BACKGROUND OF THE INVENTION

Many decorative hardware brackets such as soap dishes, toothbrush and cup holders, robe hooks and the like have a decorative rose plate and a decorative outer post member that can be adapted to mount a glass shelf, soap dish or toothbrush holder and the like. The rose plate and decorative post member are often separate members and are assembled onto a concealed bracket. One common way of mounting the post is with a set screw. The post has a threaded aperture laterally extending therethrough from a central bore. The set screw extends through the aperture to extend into the bore to engage a cylindrical or tapered post section of the concealed bracket. The rose plate is annular and is mounted over a flanged mounting plate section of the concealed bracket.

However, problems are inherent in a set screw mounting system in that the set screw which often has a pointed inner end does not adequately cam the decorative post backward against the rose plate. When this happens, the outer decorative post may wobble along a plane transverse to the axis of the set screw. In other words, if the set screw is mounted from the bottom side of the post, the decorative post can wobble to the left and right along a horizontal plane.

Furthermore, with decorative shelves that extend outward from the post, a torque can be exerted on the decorative post against the frictional engagement of the set screw. Since the set screw is only engaged along a very small point, the torque can overcome the frictional anchor provided by the pointed end of the set screw and force the post to rotate about the concealed bracket. As a result, the shelves become angled and cease to function properly.

Attempts have been made to eliminate the disadvantages of a set screw by substituting a threaded bolt passing through a lateral unthreaded aperture in the decorative post and engaging a threaded aperture in the concealed bracket. However, previous attempts to substitute a threaded bolt have not been acceptable due to manufacturing tolerances built into the concealed bracket, decorative outer post and decorative rose plate. If the threaded aperture in the concealed bracket is positioned too far from the wall, the decorative outer post, when mounted on the post, does not abut the rose plate and a gap exists between the decorative outer post and the rose plate. If the threaded aperture in the concealed bracket is too close to the wall, it may sometimes be impossible to push the decorative outer post far enough onto the concealed bracket to align its lateral aperture with the threaded aperture. Furthermore, the lateral aperture in the decorative post may not be precisely positioned and may be either too far back or too far forward on the post. As a result, the same problems in lining up the hole in the decorative post with the threaded hole in the concealed bracket occur.

What is needed is a mounting assembly that can eliminate the disadvantages of a set screw while also providing the advantages of a regular bolt engagement without the alignment problems so that a proper mounting is assured eliminating wobble of the decorative post and providing a secure assembly against the decorative rose plate.

SUMMARY OF THE INVENTION

In accordance with one aspect of the invention, a concealed mounting assembly includes an outer decorative post member having a central bore axially extending therein and a lateral aperture extending from the central bore to the external surface. A concealed bracket has a post seat section sized to slidably extend into the axial bore in the decorative post member and has a mounting plate section therebehind. An annular rose plate is mounted about the post seat against the mounting plate section secured thereagainst by abutment of the outer post member. The outer post member is tightened onto a concealed bracket by means of an axially adjustable engagement member sized to be axially adjustable within a recess section in the post seat. The engagement member is alignable with the lateral aperture and a fastener extends through the aperture in the decorative post and engagement member. Desirably the aperture is countersunk and the fastener has a complementary head to secure the post and engagement member onto the concealed bracket. Preferably, the post seat section has an axially elongated aperture laterally extending therethrough. The post seat section is interposed between the engagement member and the lateral aperture in the decorative post such that the fastener clamps the outer decorative post and the engagement member about the concealed post seat to secure the outer post engagement member and concealed post together.

Preferably, the recess section in the post has a series of ribs extending laterally thereacross and the adjustable engagement member has a complementary second series of ribs extending laterally thereacross such that the two series of ribs engage each other to prevent axial displacement of the engagement member when it is tightened onto the concealed bracket. Furthermore, there are two protruding shoulders extending on each side of the recess to prevent the engagement member from significant rotational movement within the recess before it is tightened onto the ribs of the recess.

Preferably, the axially adjustable engagement member has a threaded aperture extending through its center portion and has an arced upper contour to complement the contour of the remainder of the post seat section to fit within the axially extending bore through the outer decorative post.

In this fashion, a countersink bolt extends through the countersunk aperture in the decorative post, extends through the axial slot in the post seat and engages the threaded aperture in the adjustable engagement member. The rose plate can then be tightly mounted against the wall with the decorative post axially adjusted to abut the rose plate. The bolt passing through the slotted aperture can be tightened so that the axial engagement member nut and post are clamped about the concealed bracket to provide a secure mounting of the decorative post and rose plate free from wobble and highly resistant against any torque forces that may be exerted on the decorative post.

Furthermore, the laterally extending ribs prevent any rotation of the engagement member and therefore there can be no left to right wobble of the decorative post of the concealed bracket. The decorative post can be adjusted backwards to also be correctly positioned against the rose plate such that the rose plate and decorative plate, when properly mounted, do not have relative movement with each other but provide a fixed assembly. This fixed assembly is assured even though manufacturing tolerances provide different axial positions of the countersink aperture of the post, slotted aperture of the concealed bracket and threaded aperture of the engagement member.

BRIEF DESCRIPTION OF THE DRAWINGS

Reference now will be made to the accompanying drawings in which

FIG. 1 is a side cross-sectional view of a decorative outer post and rose plate mounted about a concealed bracket according to one embodiment of the invention;

FIG. 2 is a perspective view of the concealed bracket shown in FIG. 1;

FIG. 3 is a cross-sectional view taken along the lines 3—3 in FIG. 1;

FIG. 4 is a perspective view of the securement nut shown in FIG. 1; and

FIG. 5 is a side elevational view of the securement nut shown in FIG. 4.

DETAILED DESCRIPTION OF THE PREFERRED EMBODIMENT

Referring to FIG. 1, shown in cross-section is the decorative outer post member 10 mounted against a decorative rose plate 12. The outer contour of the post 10 and rose plate 12 is purely a matter of design and can range from simple cylindrical surfaces having a modern look to the classical detailed contoured look as shown. The outer post 10 has an axially extending bore 14 bounded by side wall 15 and a lateral countersunk hole 16 extending from the bore 14 to the outer surface of the post 10. The rose plate 12 has an annular seat section 18 sized to seat the end 20 of post 10. Rose plate 12 also has a central aperture 22 and a counterbore 23.

As shown in FIGS. 1 and 2, the concealed bracket 24 has a post section 26 sized to pass through aperture 22 and fit in bore 14 and a mounting plate section 28 sized to fit in the counterbore 23. The mounting plate section 28 has two countersunk apertures 30 which can receive screws or toggle bolts 32 mounted on a wall or other similar surface 33. The post section 26 has a tapered distal end 35 so that it can be easily guided into the bore 14. In addition it has a recess section 36 having at each lateral end an axial extending raised shoulder 38 and a series of corrugations or ribs 40 laterally extending from shoulder to shoulder 38. A slotted or axially elongated aperture 42 extends from a mid section of recess section 36 through the post section 26.

An engagement member, i.e. a securement nut 44, has a complementary series of ribs or corrugations 46 that engage the ribs 40 in post section 26. The securement nut 44 has two side edges 47 spaced apart to fit between the shoulders 38. Midway between the side edges 47 is a threaded aperture 48 to be laterally aligned with respect to elongated slot 42. The top surface 49 of the nut is arcuate to match the post section's outer contour 27. The depth of the nut is such that when the surface 44 is aligned with the outer contour 27 of the post section 26 the ribs 46 are disengaged from ribs 40 to allow axial movement of the securement nut within recess 36. As shown in FIG. 3, when the securement nut is clamped down onto the post section 26 the outer upper surface 49 is spaced away from the inner wall 15 about bore 14 to form gap 51. The two side walls 52 and 54 of the securement nut are spaced such that when either wall 52 or 54 abuts an edge wall 37 and 39 of the recess, the threaded aperture 48 maintains its alignment above elongated aperture 42.

Assembly of the rose plate and post is easily accomplished. First the concealed bracket 28 is mounted on the wall 34 via the two screws 32. Rose plate 12 is then positioned in place as shown in FIG. 1. Securement nut 44 is then placed within recess 36. The outer post 10 is then slid onto the post section 26 until the end 20 abuts the seat 18 and the rose plate 12. A countersink machine screw 56 is then extended through the countersink hole 16 and elongated slot 42 to engage threaded aperture 48. The securement nut can be axially shifted over elongated aperture 42 such that it is in direct alignment with the lateral countersunk hole, i.e. aperture 16 as the screw 56 seats in aperture 48. The gap 51 between securement nut 44 and inner wall 15 provides for adjustment of the nut along the recess by allowing the nut to be raised away from ribs 40 so that ribs 46 and ribs 40 disengage from each other. The securement nut can be axially adjusted along the recess 36 to correct for any manufacturing tolerances in post 10, concealed bracket 24, and rose plate 12 so that aperture 48 can properly be aligned with hole 16 so that bolt 56 can pass through elongated slot 42 as the bolt engages hole 16 and threaded aperture 48.

The bolt is then tightened so that the ribs 46 engage ribs 40 and securement nut 44 and outer post 10 clamp about the post section 26 to secure the rose plate 12 and outer post 10 onto the concealed bracket 24 to provide a secure and fixed assembly.

While the machine screw 56 is rotated, the securement nut 44 is prevented from rotating via the engagement of ribs 42 onto ribs 40 and the side walls 47 abutting the shoulders 38.

Once assembled, the post 10 cannot rotate about its own axis because post 10 is secured via the threaded countersink machine screw 56 to the anchored securement nut 44. Secondly, post 10 cannot wobble due to frictional engagement with the screw 56 in the countersunk hole 16.

Post 10 can be adjusted along the axial dimension of post section 26 so that its end 20 is always secured and abuts against the seat section 18 in rose plate 12 when rose plate 12 is flushly abutting wall 33.

When the assembly is fixed together, the concealed bracket including its post section 26 and its mounting plate 28 is concealed behind post 10 and rose plate 12 with rose plate 12 and post 10 providing a fixed assembly on concealed bracket 24.

Variations and modifications of the present invention are possible without departing from the scope and spirit as defined in the appended claims.

The embodiment in which an exclusive property or privilege is claimed is defined as follows:

1. A concealed mounting assembly characterized by:
    an outer post member having a bore extending therein and a lateral aperture extending from the bore to an external surface of the post;
    a concealed bracket means having a post seat section sized to fit in said bore for mounting said post thereon;
    said post seat section having an axially extending recess section;
    an adjustable engagement member sized to be axially adjustable within said recess section and alignable with said lateral aperture with means for receiving a fastener which secures said post and engagement member onto said concealed inner bracket means;

an annular rose plate mounted about said post seat and against said mounting plate section and secured thereagainst by abutment against said outer post member such that said mounting plate section is concealed behind said rose plate.

2. A concealed mounting assembly as defined in claim 1 further characterized by:
an axially elongated aperture laterally extending in said post seat section;
said adjustable engagement member and said lateral aperture in said outer post member disposed on opposite lateral sides of said outer post member such that said fastener clamps said outer post and said engagement member about said concealed bracket means to secure said outer post member, engagement member, and concealed bracket means together.

3. A concealed mounting assembly as defined in claim 2 further characterized by:
said lateral aperture in said outer post member being countersunk and said fastener having a countersink head.

4. A concealed mounting assembly as defined in claim 1 further characterized by:
a first series of ribs extending laterally across said recess section;
said adjustable engagement member having a complementary second series of ribs extending laterally thereacross to engage said first series of ribs to prevent axial displacement of said adjustable engagement member when said fastener secures said outer post to said concealed inner bracket member.

5. A mounting assembly characterized by:
a mounting post;
a mountable post to be secured on said mounting post having a bore section sized to receive a section of said mounting post;
said mountable post having a lateral extending aperture;
a recess in one of said mounting or mountable post sized for receiving at a plurality of axial positions a securement nut;
means for preventing rotation of said securement nut in said recess;
said securement nut having engagement means that is alignable with said lateral extending aperture for engaging a threaded fastener for securement of said mountable post onto said mounting post.

6. A mounting assembly as defined in claim 5 further characterized by:
said recess having a first series of laterally extending ribs;
said securement nut having a second series of laterally extending ribs engageable to said first series of laterally extending ribs for preventing axial movement of said securement nut with respect to said mounting post when said threaded fastener fixes said mountable post to said securement nut and said mounting post.

7. A mounting assembly as defined in claim 6 further characterized by:
said means for preventing rotation including two axially extending raised shoulders on opposite ends of said first series of ribs.

8. A mounting assembly as defined in claim 6 further characterized by:
an axially elongated aperture laterally extending through said mounting post at said recess section;
said securement nut and said lateral aperture in said mountable post disposed on opposite lateral sides of said mountable post such that said threaded fastener passes through said lateral extending aperture in said mountable post and through said axially elongated aperture to engage said engagement means in said securement nut and clamp said mountable post and said securement nut abut said mounting post to secure the mountable post, mounting post and securement nut together.

* * * * *